United States Patent
Wu et al.

(10) Patent No.: US 11,949,137 B2
(45) Date of Patent: Apr. 2, 2024

(54) COMB-SHAPED STRUCTURE POLYBENZIMIDAZOLE ANION EXCHANGE MEMBRANE WITH HIGH CONDUCTIVITY AND PREPARATION METHOD THEREOF

(71) Applicant: DALIAN UNIVERSITY OF TECHNOLOGY, Liaoning (CN)

(72) Inventors: Xuemei Wu, Liaoning (CN); Gaohong He, Liaoning (CN); Xiaozhou Wang, Liaoning (CN); Xiaoming Yan, Liaoning (CN); Tiantian Li, Liaoning (CN); Wanting Chen, Liaoning (CN); Xiangcun Li, Liaoning (CN); Wu Xiao, Liaoning (CN); Xiaobin Jiang, Liaoning (CN); Fujun Cui, Liaoning (CN); Yan Dai, Liaoning (CN); Xuehua Ruan, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 563 days.

(21) Appl. No.: 17/269,835

(22) PCT Filed: Mar. 19, 2020

(86) PCT No.: PCT/CN2020/080159
§ 371 (c)(1),
(2) Date: Feb. 19, 2021

(87) PCT Pub. No.: WO2020/233213
PCT Pub. Date: Nov. 26, 2020

(65) Prior Publication Data
US 2021/0202972 A1     Jul. 1, 2021

(30) Foreign Application Priority Data
May 21, 2019   (CN) .......................... 201910422077.0

(51) Int. Cl.
*H01M 8/1072*     (2016.01)
*C08G 73/18*      (2006.01)
(Continued)

(52) U.S. Cl.
CPC .......... *H01M 8/1072* (2013.01); *C08G 73/18* (2013.01); *H01M 8/1067* (2013.01); *H01M 8/1081* (2013.01); *H01M 8/1086* (2013.01)

(58) Field of Classification Search
CPC ... H01M 8/1067; H01M 8/1072; H01M 8/107
See application file for complete search history.

(56) References Cited

FOREIGN PATENT DOCUMENTS

| CN | 101392060 A | 3/2009 |
|---|---|---|
| CN | 107674417 A | 2/2018 |

(Continued)

OTHER PUBLICATIONS

Machine Translation of: CN 108586745 A, Chen et al., Sep. 28, 2018.*

(Continued)

*Primary Examiner* — Kenneth J Douyette
(74) *Attorney, Agent, or Firm* — Muncy, Geissler, Olds & Lowe, P.C.

(57) ABSTRACT

The present invention belongs to the field of alkaline polymer electrolyte membranes, and relates to a comb-shaped structure polybenzimidazole anion exchange membrane with high conductivity and preparation method thereof. In the invention, firstly, polybenzimidazole is grafted with the non-cationic side chains to the max grafting rate to synthesize the de-protonated comb-shaped polybenzimidazole material, avoiding the N—H in benzimidazole forms ionic binding with cationic functional groups, which will reduce the reactivity and mobility of cationic groups; then react de-protonated comb-shaped polybenzimidazole with quaternization reagent to attach the pendent side chain with (Continued)

cationic functional groups, making it easy to aggregate to form ion clusters and hydrophilic/hydrophobic microphase separation. The anion exchange membrane prepared in this invention has excellent conductivity, mechanical properties and alkaline stability.

4 Claims, 3 Drawing Sheets

(51) Int. Cl.
*H01M 8/1067* (2016.01)
*H01M 8/1081* (2016.01)
*H01M 8/1086* (2016.01)

(56) References Cited

FOREIGN PATENT DOCUMENTS

| CN | 108586745 A | 9/2018 |
|---|---|---|
| CN | 109280198 A | 1/2019 |
| CN | 109411795 A | 3/2019 |
| CN | 109638326 A | 4/2019 |
| CN | 110112448 A | 8/2019 |
| WO | WO-2012/035556 A1 | 3/2012 |

OTHER PUBLICATIONS

Machine Translation of: CN 107674417 A, Gao et al., Feb. 9, 2018.*
Machine Translation of: CN 109280198 A, Dai et al., Jan. 29, 2019.*
Hou, Hongying, et al., "Durability study of KOH doped polybenzimidazole membrane for air-breathing alkaline direct ethanol fuel cell," Journal of Power Sources, vol. 196, Issue 6, Mar. 15, 2011, pp. 3244-3248.
Xia, Zijun, et al., "Polybenzimidazoles with pendant quaternary ammonium groups as potential anion exchange membranes for fuel cells," Journal of Membrane Science, vols. 390-391, Feb. 15, 2012, pp. 152-159.
Jheng, Li-cheng, et al., "Quaternized polybenzimidazoles with imidazolium cation moieties for anion exchange membrane fuel cells," Journal of Membrane Science, vol. 460, Jun. 15, 2014, pp. 160-170.

* cited by examiner

COMB-SHAPED STRUCTURE POLYBENZIMIDAZOLE ANION EXCHANGE MEMBRANE WITH HIGH CONDUCTIVITY AND PREPARATION METHOD THEREOF

TECHNICAL FIELD

The present invention belongs to the technical field of alkaline polymer electrolytes, and relates to a comb-shaped structure polybenzimidazole anion exchange membrane with high conductivity and the preparation method thereof.

BACKGROUND

With the growth of global energy use, non-renewable energy such as fossil fuels will be increasingly exhausted and have a serious impact on the environment. China as a large country of fossil energy consumption, in the face of environmental and energy crisis, there is an urgent need to develop fuel cell technology which can use clean fuels such as hydrogen and methanol without additional pollution. Anion exchange membrane alkaline fuel cell has excellent performance and wide application prospect, and its core component, anion exchange membrane directly affects the performance of fuel cell. However, compared with the proton exchange membrane, anion exchange membrane has some disadvantages such as low conductivity and poor alkali stability, which would hinder the further development of alkaline fuel cell technology. Therefore, it is of great significance for the commercialization of anion exchange membranes to improve the conductivity and alkali stability of anion exchange membranes.

The common structure of anion exchange membranes are polymer backbone and cationic groups containing side chain. Among them, the polymer backbone used in anion exchange membrane is an important factor affecting the performance of anion exchange membrane, while the commonly used polymers, such as polysulfone and polyethersulfone lack of sufficient alkali stability and are easy to degrade in alkaline solution at high temperature.

Polybenzimidazole (PBI) is a high-performance engineering plastic with excellent alkali stability and mechanical strength. However, compared with the commonly used polymer-based anion exchange membranes such as polysulfone and polyethersulfone, the conductivity of PBI-based anion exchange membranes reported in the literatures are still at a very low level. J. Membr. Sci. 460, (2014) 160. reported a functionalized PBI with imidazole cation and ether bonds containing side chain. The prepared anion exchange membrane exhibits good mechanical properties, but its conductivity could only reach 27.2 mS cm$^{-1}$ at 80° C. J. Membr. Sci. 390-391, (2012) 152 grafted the N-methylmorpholine cation containing side chain onto PBI, and the conductivity of the prepared anion exchange membrane is only 2.9 mS cm$^{-1}$ at 60° C. The conductivity of alkali doped PBI anion exchange membrane prepared by J. Power Sources 196 (6), (2011), 3244-3248. decreased from 23 mS cm$^{-1}$ to 10 mS cm$^{-1}$ within 100 hours. Improve the conductivity of PBI-based anion exchange membrane is still a difficult problem remained to be solved.

SUMMARY

In order to solve the above problems, the present invention proposed a comb-shaped structure PBI anion exchange membrane with high conductivity and a preparation method thereof. Firstly, PBI is grafted with the non-cationic side chains to synthesize the deprotonated comb-shaped PBI material to the max grafting rate, avoiding the N—H in PBI forms ionic binding with cationic groups, which will reduce the reactivity and mobility of cationic groups; then react comb-shaped PBI with quaternization reagent to attach the pendent side chain with cationic groups, making them easy to aggregate to form ion clusters and hydrophilic/hydrophobic microphase separation. The anion exchange membranes prepared in the present invention show excellent conductivity, mechanical properties and alkaline stability.

The technical solution of the invention is as follows:

A comb-shaped structure PBI anion exchange membrane with high conductivity, wherein the molecular structure thereof is as follows:

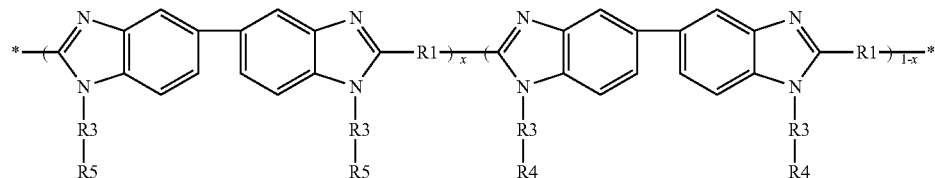

where 0<x≤1;

The structure of —R1- is as follows, and is the same or different:

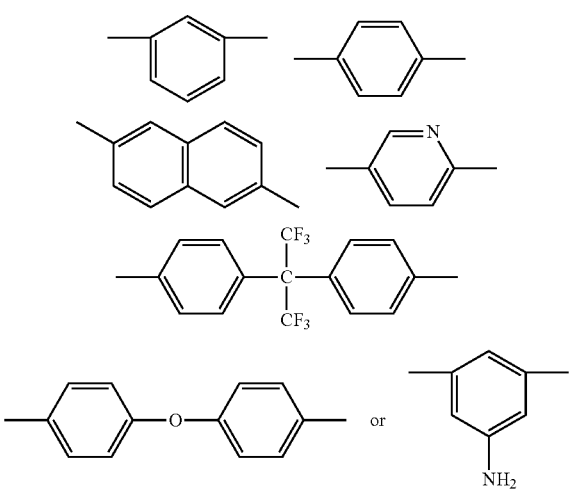

R3 is a full carbon chain or an ether oxygen bonds containing carbon chain, with a total length of 1-14 atoms; R3 is the same or different;

R4 is a hydrogen atom or halogen; R4 is the same or different;

R5 is quaternary ammonium cation, and R5 is the same or different; the quaternary ammonium cation includes 1-methylimidazole cation, N-methylpiperidine cation and N-methylmorpholine cation.

A preparation method of the comb-shaped structure PBI anion exchange membrane with high conductivity, the preparation steps are as follows:

(1) Synthesis of deprotonated comb-shaped PBI material: PBI is dissolved in solvent A to form a solution with a mass fraction of 1-5 wt. %, and then side chain

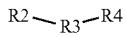

without quaternary ammonium cation and acid-binding agents are added into the solution. The molar ratio of side chain

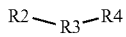

and acid-binding agents to N—H protons are both greater than 1:1, and the mixture is reacted at −18° C. to 100° C. for 48-168 h until a bright yellow liquid is obtained. The bright yellow liquid is precipitated in precipitant B to obtain solid material. After filtration and vacuum drying at room temperature for 12-24 hours, the deprotonated comb-shaped PBI material is obtained.

The side chain

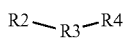

without quaternary ammonium cation, wherein R2 is halogen, aldehyde group or epoxy group.

(2) Preparation of comb-shaped structure PBI anion exchange membrane with high conductivity: the deprotonated comb-shaped PBI material obtained in step (1) is dissolved in DMSO solvent to form a mass fraction of 1-5 wt. % solution. After adding quaternization reagent and reacting at 40° C. to 100° C. for 24-48 h, the reaction solution is poured into precipitant C and a solid product is obtained. After filtering and drying the solid product at room temperature after 12-24 h, comb-shaped structure PBI material with high-conductivity is obtained; the comb-shaped structure PBI anion exchange membrane with high conductivity is prepared by dissolving the comb-shaped structure PBI material with high-conductivity in DMSO solvent to form a membrane casting solution with a mass fraction of 1-5 wt. %, followed by casting the membrane and drying it under the condition of 60° C. for 48-96 h, and then soaking the membrane in 1 M KOH solution for 24-72 h and washing to neutral in deionized water, the comb shaped structure PBI anion exchange membrane with high conductivity is obtained.

The synthesis scheme is as follow:

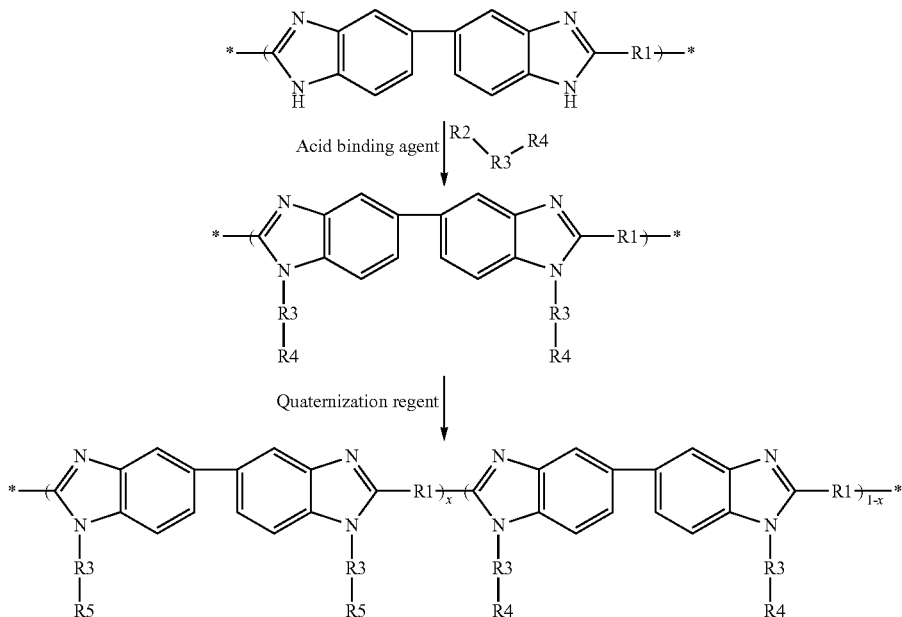

The de-protonation means that the PBI is fully grafted with non-cationic side chain to remove all N—H protons from the PBI main chain, forming a comb-shaped structure in which each polybenzimidazole repeat unit is grafted with a side chain.

The solvent A is one or more mixtures of DMF, DMAc, NMP or DMSO; the precipitant B is one or more mixtures of water, ethyl acetate or acetone; and the precipitant C is ethyl acetate, acetone or mixture of ethyl acetate and acetone.

The acid-binding agent is one or more mixtures of sodium hydroxide, potassium hydroxide, sodium carbonate, potassium carbonate, sodium hydroxide or potassium hydride; the quaternization reagent is one or more mixtures of trimethylamine, 1-methylimidazole, 1-dimethylimidazole, N-methylpiperidine or N-methylmorpholine.

The beneficial effect of the present invention: The present invention provides a method for preparing a comb-shaped structure PBI anion exchange membrane. Firstly, all protons in the PBI are removed by fully grafting non-cationic side chain to form a comb-shaped structure to improve conductivity of membrane; then the non-cationic side chain is quaternized to connect the cationic groups which could conduct OH−, so that the material can be used as an anion exchange membrane. The prepared comb-shaped structure can avoid the formation of the ionic binding of N—H in benzimidazole and cationic groups, which will reduce the reactivity and mobility of cationic groups. The prepared comb-shaped structure can also promote the microphase separation in the membrane and further improve the conductivity of the membrane. The anion exchange membrane prepared in the present invention has excellent conductivity, mechanical properties and alkaline stability, and the membrane preparation method solves the problem of extremely low conductivity of PBI-based anion exchange membrane.

DETAILED DESCRIPTION

Figure 1:
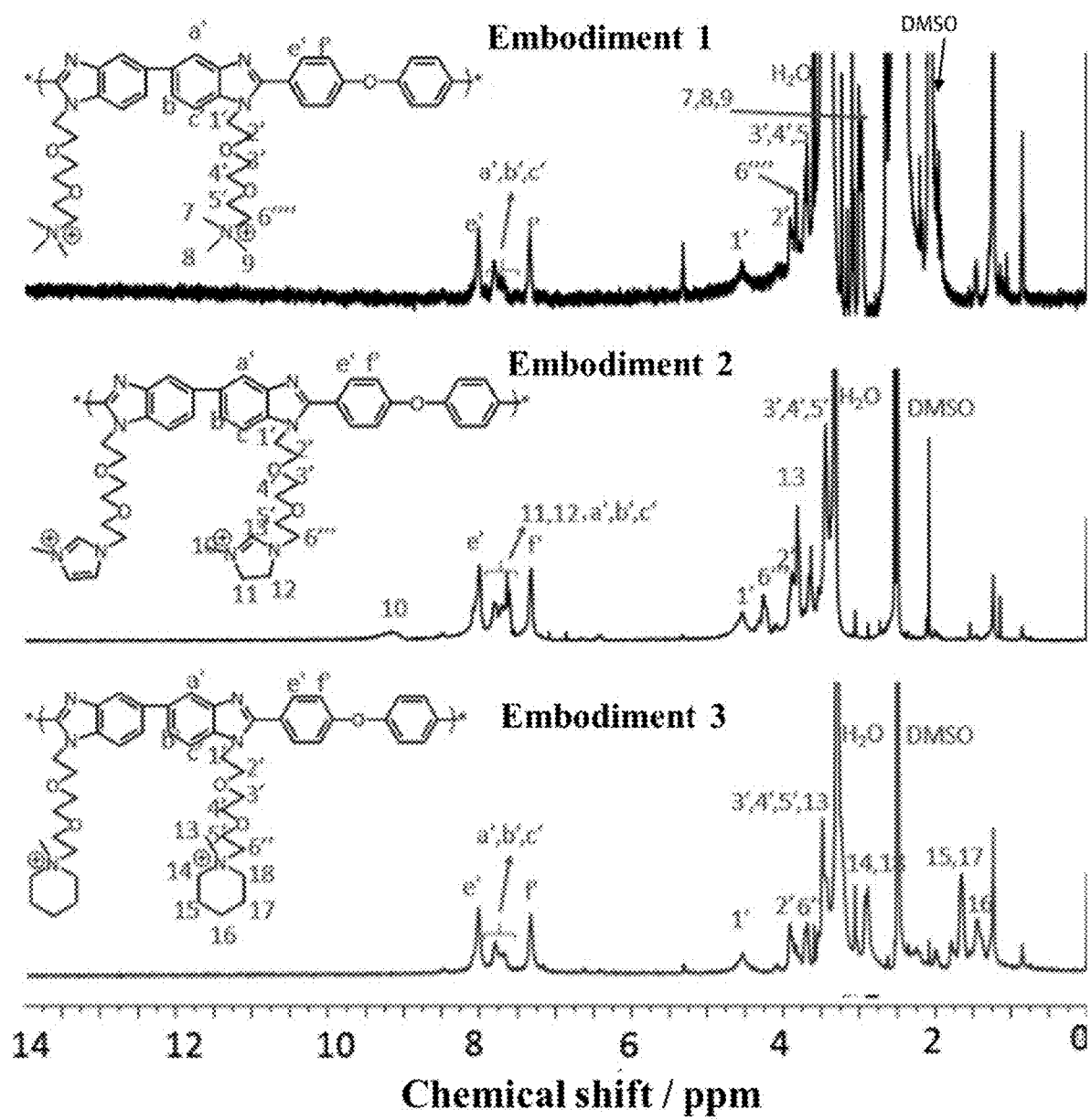
FIG. 1 shows the $^1$H-NMR spectra of comb-shaped structure PBI anion exchange membranes. Characteristic peaks at $\delta=7.4$ ppm-8.0 ppm appear in all three embodiments, corresponding to $H_{a,b,c'}$ and $H_{e,f}$, protons in the main chain of PBI, respectively. In the high field ($\delta<4.5$ ppm), the characteristic peaks of side chain are appeared, in which the $H_1'$ proton appears at $\delta=4.5$ ppm, and the other protons on the side chain appear at $\delta=3.5$ ppm-4.0 ppm. The characteristic peaks of different cationic groups appear at different positions. In embodiments 1, the characteristic peaks of quaternary ammonium cation, $H_{7,8,9}$ appear at $\delta=2.98$ ppm; in embodiments 2, the characteristic peaks of imidazole cation, $H_{10}$, appears at $\delta=9.0$ ppm; in embodiments 3, the characteristic peak of piperidine cation, $H_{15, 17}$ appears at $\delta=1.6$-1.8 ppm. $^1$H-NMR spectra shows that the comb-shaped structure PBI anion exchange membranes were successfully synthesized in the three embodiments.
Figure 2:
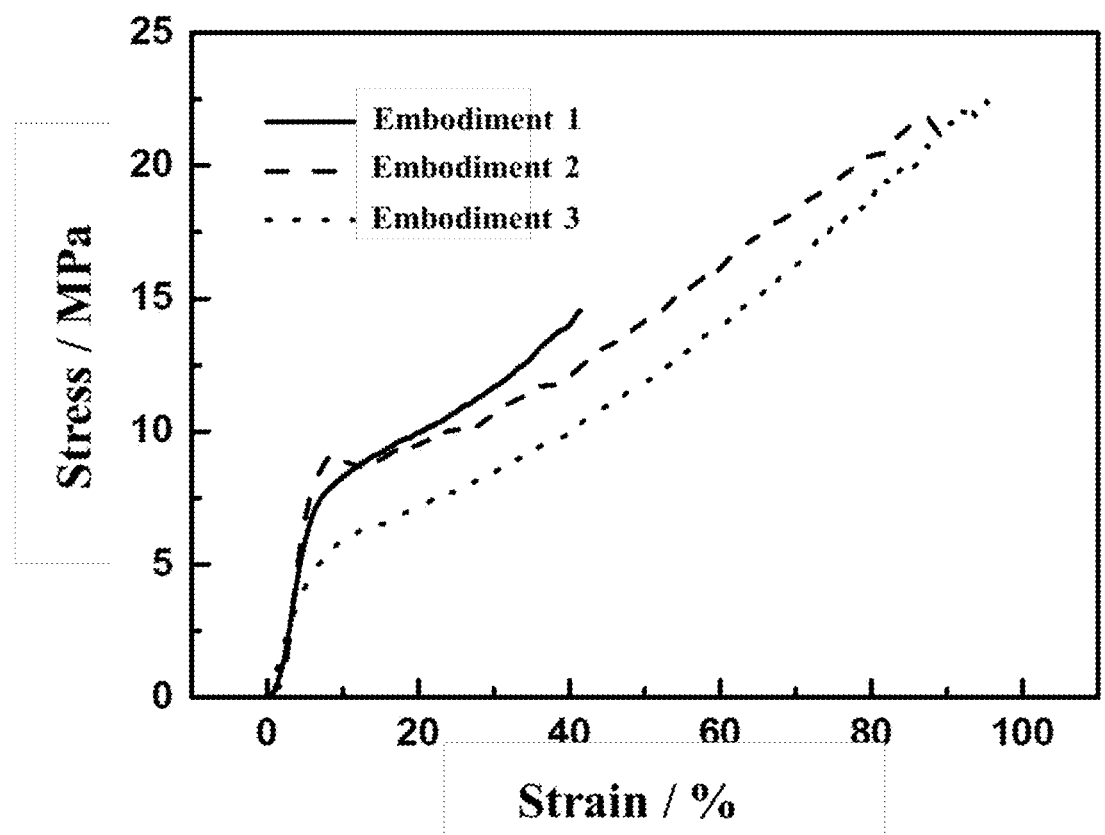
FIG. 2 shows the mechanical properties of the hydrated comb-shaped structure PBI anion exchange membrane. The elongation and tensile strength of the quaternary ammonium cation functionalized PBI anion exchange membrane synthesized in embodiment 1 reaches 41% and 14.5 MPa, respectively. While the elongation and tensile strength of the imidazole cation functionalized PBI anion exchange membrane in embodiment 2 reach 96.3% and 23.0 MPa respectively. The breaking elongation and tensile strength of the piperidine cation functionalized PBI anion exchange membrane synthesized in embodiment 3 reached 88.5% and 21.3 MPa, respectively. The anion exchange membranes synthesized in the three embodiments all exhibit excellent mechanical properties.
Figure 3:
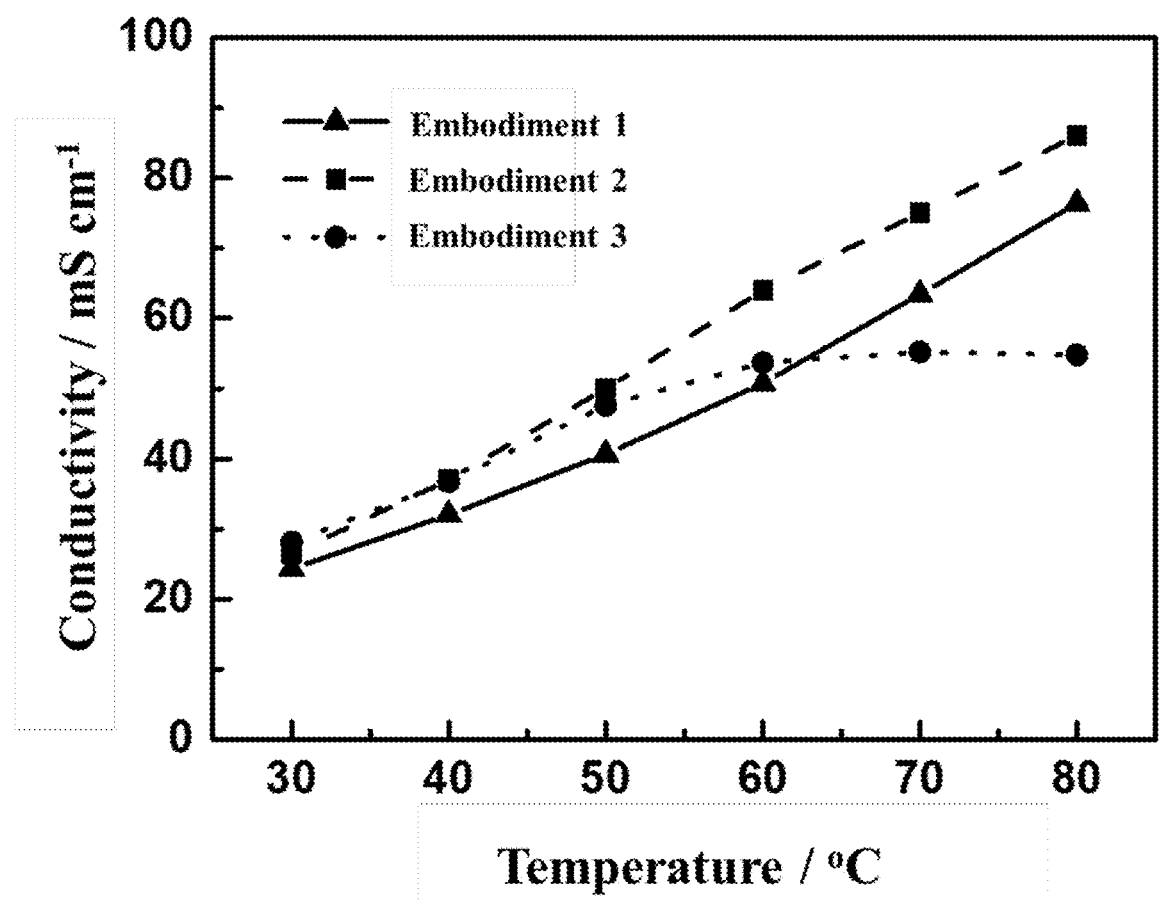
FIG. 3 shows the conductivity of comb-shaped structure PBI anion exchange membrane. The conductivity of the comb-shaped structure PBI anion exchange membranes synthesized in three embodiments increases with the increase of temperature. In 80° C., the conductivity of imidazole cation functionalized PBI anion exchange membrane synthesized in embodiment 2 is the highest, which reaches 86.1 mS cm$^{-1}$, while the conductivity of quaternary ammonium cation functionalized PBI anion exchange membrane synthesized in embodiment 1 is slightly lower than that in embodiment 2, reaching 76.3 mS cm$^{-1}$. In embodiment 3, the conductivity of piperidine cation functionalized PBI anion exchange membrane synthesized in embodiment 3 is slightly affected by water swelling at 80° C., but still reaches 54.6 mS cm$^{-1}$. The anion exchange membranes prepared in the three embodiments all exhibit excellent conductivity.

The present invention is further described in detail in combination with an implementation case below, but the embodiment of the invention is not limited to this.

Embodiment 1: Preparation of Comb-Shaped Structure PBI Anion Exchange Membrane with Quaternary Ammonium Cation Functionalized Ether Bond Containing Side Chain Synthesis of deprotonated comb-shaped structure PBI material: 1 g ether bond containing PBI (OPBI) was dissolved in 100 ml DMAc, followed by adding 30 ml non-cationic side chain 1,2-bis (2-chloroethoxy)ethane and 5 g KOH as acid binding agent and stirring at room temperature for 168 h to form a bright yellow liquid. The reaction solution was precipitated in water to obtain a yellowish solid, and then washed and precipitated repeatedly with water and acetone for three times. The obtained yellowish solid was filtered and dried at room temperature in a vacuum oven for 12 hours to obtain deprotonated comb-shaped PBI material.

Preparation of comb-shaped structure PBI anion exchange membrane with high conductivity: 0.1 g deprotonated comb-shaped PBI material was dissolved in 10 ml DMSO, followed by adding 1 ml 33% trimethylamine aqueous solution, stirred and refluxed under 60° C. for 24 hours.

A white solid was precipitated by pouring the reaction solution into ethyl acetate, and the comb-shaped structure PBI material with quaternary ammonium cation functionalized ether bond containing side chain was obtained by washing and precipitating repeatedly with water and acetone for three times, and then filtering and drying at room temperature in a vacuum oven for 12 hours. 0.06 g comb-shaped structure PBI material with quaternary ammonium cation functionalized ether bond containing side chain was dissolved in 6 ml DMSO to form a casting solution, which was centrifuged and cast in a glass plate, dried at 60° C. for 48 h, and the polymer membrane was obtained. After soaking in 1 M KOH solution for 24 h, the membrane was washed to neutral in deionized water to obtain the comb-shaped structure PBI anion exchange membrane with quaternary ammonium cation functionalized ether bond containing side chain.

The performance of the membrane was tested, and the quaternary ammonium cation functionalized PBI anion exchange membrane prepared in this embodiment shows the conductivity of 76.1 mS cm$^{-1}$, water absorption of 72.4% and swelling degree of 18.2% at 80° C. The tensile strength of membrane is 14.5 MPa and the elongation at break is 41.4%. After soaking in 2 M KOH solution at 60° C. for 720 h, the conductivity of membrane still remains 81.4%.

Embodiment 2: Preparation of Comb-Shaped Structure PBI Anion Exchange Membrane with Imidazole Cation Functionalized Ether Bond Containing Side Chain Synthesis of deprotonated comb-shaped structure PBI material: 1 g ether bond containing PBI (OPBI) was dissolved in 50 ml DMF, followed by adding 20 ml non-cationic side chain 1,2-bis (2-chloroethoxy)ethane and 2 g NaH as acid binding agent and stirring at −18° C. for 168 h to form a bright yellow liquid. The reaction solution was precipitated in acetone to obtain a yellowish solid, and then washed and precipitated repeatedly with water and acetone for three times. The obtained yellowish solid was filtered and dried at room temperature in a vacuum oven for 18 hours to obtain deprotonated comb-shaped PBI material.

Preparation of comb-shaped structure PBI anion exchange membrane with high conductivity: 0.1 g deprotonated comb-shaped PBI material was dissolved in 4 ml DMSO, followed by adding 1 ml 1-methylimidazole, stirred and refluxed under 80° C. for 36 hours; A white solid was precipitated by pouring the reaction solution into ethyl acetate, and the comb-shaped structure PBI material with imidazole cation functionalized ether bond containing side chain was obtained by washing and precipitating repeatedly with water and acetone for three times, and then filtering and drying at room temperature in a vacuum oven for 18 hours. 0.1 g comb-shaped structure PBI material with quaternary ammonium cation functionalized ether bond containing side chain was dissolved in 4 ml DMSO to form a casting solution, which was centrifuged and cast in a glass plate, dried at 60° C. for 72 h, and the polymer membrane was obtained. After soaking in 1 M KOH solution for 48 h, the membrane was washed to neutral in deionized water to obtain the comb-shaped structure PBI anion exchange membrane with quaternary ammonium cation functionalized ether bond containing side chain.

The performance of the membrane was tested, and the imidazole cation functionalized PBI anion exchange membrane prepared in this embodiment shows the conductivity of 86.3 mS cm$^{-1}$, water absorption of 92.5% and swelling degree of 32.9% at 80° C. The tensile strength of membrane is 23.0 MPa and the elongation at break is 96.3%. After soaking in 2 M KOH solution at 60° C. for 720 h, the conductivity of membrane still remains 37.3%.

Embodiment 3: Preparation of Comb-Shaped Structure PBI Anion Exchange Membrane with Piperidine Cation Functionalized Ether Bond Containing Side Chain Synthesis of deprotonated comb-shaped structure PBI material: 1 g ether bond containing PBI (OPBI) was dissolved in 20 ml NMP, followed by adding 30 ml non-cationic side chain 1,2-bis (2-chloroethoxy)ethane and 5 g $K_2CO_3$ as acid binding agent and stirring at 100° C. for 48 h to form a bright yellow liquid. The reaction solution was precipitated in acetone to obtain a yellowish solid, and then washed and precipitated repeatedly with water and acetone for three times, filtered and dried at room temperature in a vacuum oven for 24 hours to obtain deprotonated comb-shaped PBI material.

Preparation of comb-shaped structure PBI anion exchange membrane with high conductivity: 0.3 g deprotonated comb-shaped PBI material was dissolved in 6 ml DMSO, followed by adding 1 ml N-methyl piperidine, stirred and refluxed under 100° C. for 48 h; A white solid was precipitated by pouring the reaction solution into ethyl acetate, and the comb-shaped structure PBI material with piperidine cation functionalized ether bond containing side chain was obtained by washing and precipitating repeatedly with water and acetone for three times, and then filtering and drying at room temperature in a vacuum oven for 24 hours. 0.3 g comb-shaped structure PBI material with piperidine cation functionalized ether bond containing side chain was dissolved in 6 ml DMSO to form a casting solution, which was centrifuged and cast in a glass plate, dried at 60° C. for 96 h, and the polymer membrane was obtained. After soaking in 1 M KOH solution for 72 h, the membrane was washed to neutral in deionized water to obtain the comb-shaped structure PBI anion exchange membrane with piperidine cation functionalized ether bond containing side chain.

The performance of the membrane was tested, and the piperidine cation functionalized PBI anion exchange membrane prepared in this embodiment shows the conductivity of 54.6 mS cm$^{-1}$, water absorption of 298.5% and swelling degree of 51.5% at 80° C. The tensile strength of membrane is 21.3 MPa and the elongation at break is 88.5%. After soaking in 2 M KOH solution at 60° C. for 720 h, the conductivity of membrane still remains 90.2%.

The invention claimed is:

1. A preparation method of comb-shaped polybenzimidazole anion exchange membrane, comprising the steps as follows:

(1) synthesis of deprotonated comb-shaped side chain grafted polybenzimidazole material: dissolving polybenzimidazole in solvent A to form a solution with a mass fraction of 1-5 wt. %, and then adding acid binding agent and side chain R2-R3-R4 without quaternary ammonium cations; molar ratio of the side chain R2-R3-R4 without quaternary ammonium cations and acid binding agent to N—H proton is both greater than 1:1; reacting at −18° C. to 100° C. for 48-168 h until a bright yellow liquid is formed; the bright yellow liquid produced is precipitated in precipitator B to obtain a solid, which is filtered and dried in vacuum at room temperature for 12-24 h to obtain a deprotonated comb-shaped side chain grafted polybenzimidazole material;

the side chain R2-R3-R4 without quaternary ammonium cation, wherein R2 is halogen, aldehyde group or epoxy group;

(2) preparation of comb-shaped structure polybenzimidazole anion exchange membrane: dissolving the deprotonated comb-shaped side chain grafted polybenzimidazole material obtained in step (1) in DMSO solvent to form a solution with a mass fraction of 1-5 wt. %, followed by adding quaternization reagent and reacting at 40° C. to 100° C. for 24-48_h, and obtaining a reaction solution; pouring the reaction solution into precipitator C, a solid product is precipitated, filtered and dried at room temperature for 12-24 h, comb-shaped structure polybenzimidazole material is obtained, dissolving the comb-shaped structure polybenzimidazole material in DMSO solvent to form a casting solution with a mass fraction of 1-5 wt. %, and then casting the casting solution into a membrane, which is dried under a condition of 60° C. for 48-96 h; immersing the membrane in 1 MKOH solution for 24-72 h, and then washing to neutral in deionized water to obtain the comb-shaped structure polybenzimidazole anion exchange membrane;

the solvent A is a mixture of one or more of DMF, DMAc, NMP or DMSO; a precipitant B is one or more of water, ethyl acetate or acetone; and the precipitant C is ethyl acetate or acetone or a mixture of both;

a reaction formula is as follows:

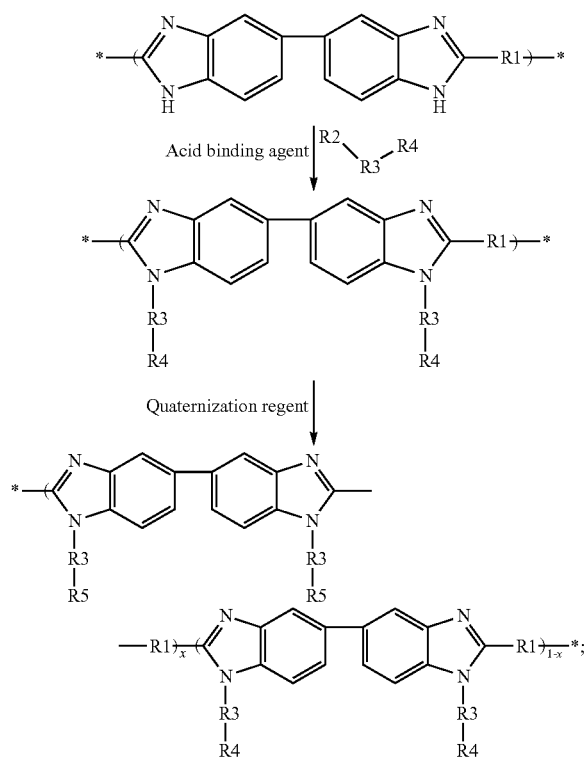

molecular structure of the comb-shaped structure polybenzimidazole anion exchange membrane is as follows:

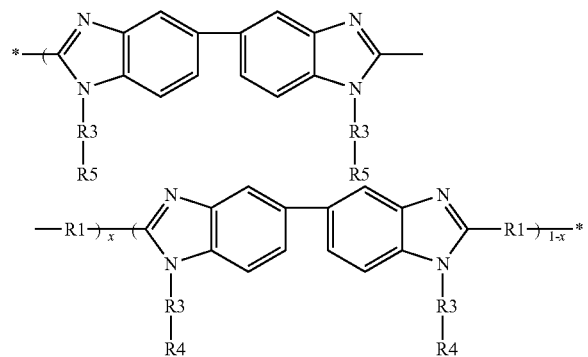

wherein $0<x\leq 1$;
structure of —R1- is as follow, and each —R1- is a same structure or a different structure:

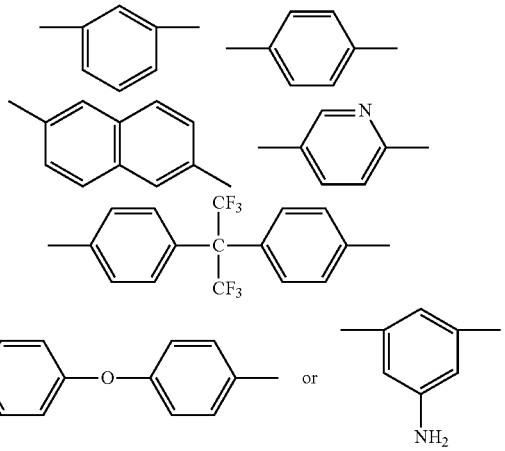

R3 is a carbon chain containing ether oxygen bond, with a total length of 1-14 atoms; each R3 is a same structure or a different structure;

R4 is a hydrogen atom or halogen; each R4 is a same structure or a different structure;

R5 is a quaternary ammonium cation, and each R5 is a same structure or a different structure.

2. The preparation method of the comb-shaped structure polybenzimidazole anion exchange membrane according to claim 1, wherein deprotonation refers to grafting polybenzimidazole with the side chain R2-R3-R4 without quaternary ammonium cation to max grafting rate, thereby removing all N—H protons from a main chain of polybenzimidazole, and each polybenzimidazole repeat unit is grafted with a functional side chain to form the comb-shaped structure.

3. The preparation method of the comb-shaped structure polybenzimidazole anion exchange membrane according to claim 1, wherein the acid binding agent is one or more of sodium hydroxide, potassium hydroxide, sodium carbonate, sodium hydroxide or potassium hydride; a quaternization reagent is one or more mixtures of trimethylamine, 1-methylimidazole, 1-dimethylimidazole, N-methylpiperidine or N-methylmorpholine.

4. The preparation method of the comb-shaped structure polybenzimidazole anion exchange membrane according to claim 2, wherein the acid binding agent is one or more of sodium hydroxide, potassium hydroxide, sodium carbonate, sodium hydroxide or potassium hydride; a quaternization reagent is one or more mixtures of trimethylamine, 1-methylimidazole, 1-dimethylimidazole, N-methylpiperidine or N-methylmorpholine.

* * * * *